US005612137A

United States Patent [19]
Scholz

[11] Patent Number: 5,612,137
[45] Date of Patent: Mar. 18, 1997

[54] REPULPABLE SPLICING TAPE

[75] Inventor: William F. Scholz, Altadena, Calif.

[73] Assignee: Avery Dennison Corporation, Pasadena, Calif.

[21] Appl. No.: 484,026

[22] Filed: Jun. 7, 1995

Related U.S. Application Data

[62] Division of Ser. No. 207,356, Mar. 7, 1994, Pat. No. 5,550,181.

[51] Int. Cl.$^6$ ............................. B32B 7/12; C08F 220/06
[52] U.S. Cl. ................................... 428/355 AC; 428/354; 526/318.3; 526/318.4; 524/460; 524/833
[58] Field of Search ................................. 428/354, 355; 526/318.3, 318.4; 524/833, 460

[56] References Cited

U.S. PATENT DOCUMENTS

| | | | |
|---|---|---|---|
| 3,441,430 | 4/1969 | Peterson | 117/68.5 |
| 3,865,770 | 2/1975 | Blake | 260/27 R |
| 4,052,368 | 10/1977 | Larson | 428/481 X |
| 4,413,080 | 11/1983 | Blake | 524/187 |
| 4,569,960 | 2/1986 | Blake | 524/145 |
| 4,759,983 | 7/1988 | Knutson et al. | 428/343 |
| 5,008,329 | 4/1991 | Abe et al. | 524/833 X |
| 5,049,416 | 9/1991 | Wilczynski | 427/208.4 |
| 5,183,841 | 2/1993 | Bernard | 526/318.4 X |
| 5,196,504 | 3/1993 | Scholz et al. | 526/318.4 |
| 5,278,227 | 1/1994 | Bernard | 524/833 X |

OTHER PUBLICATIONS

1991 TAPPI Useful Methods 204, "Deinkability of waste papers," pp. 14–15.
1991 TAPPI Useful Methods 213, "Repulpability of splices/splicing tape," p. 21.

*Primary Examiner*—Daniel Zirker
*Attorney, Agent, or Firm*—Christie, Parker & Hale, LLP

[57] ABSTRACT

A splicing tape adhesive comprising 97% to 45% by weight of an emulsion polymer formed of from about 80% to 90% by weight of monomers comprising a major portion of at least alkyl acrylate containing from 4 to about 8 carbon atoms in the alkyl group and from about 20% to 10% by weight of a least one carboxylic acid, said emulsion polymer formed in the presence of anionic and nonionic surfactants to provide a polymer having a glass transition temperature of −15° to −50° C. in the presence of a chain transfer agent, from about 25% by weight of an acrylic polymer having a glass transition of less than −50° C. and about 3% to about 20% by weight plasticizer.

7 Claims, No Drawings

REPULPABLE SPLICING TAPE

CROSS REFERENCE TO RELATED APPLICATION

This is related to application Ser. No. 211,763 filed Apr. 14, 1994 now U.S. Pat. No. 5,536,800, which is a continuation in part of application Ser. No. 799,555 filed Nov. 27, 1991 abandoned, which is a continuation in part of U.S. application Ser. No. 777,767 filed Oct. 19, 1991 now U.S. Pat. No. 5,196,504, each incorporated herein by reference, this application being a division of application Ser. No. 08/207,356, filed Mar. 7, 1994 now U.S. Pat. No. 5,550,181.

FIELD OF THE INVENTION

The invention relates to splicing tapes used to joining large rolls of paper in printing and converting operations.

BACKGROUND OF THE INVENTION

The present invention relates to splicing tapes using water- or alkali-dispersible emulsion polymer systems which are functional as pressure-sensitive adhesives. The splicing tapes of the invention are an ecologically friendly replacement for conventional repulpable splicing tapes.

For a tape construction to be repulpable, the adhesive must, for some markets, be water-dispersible or cold water-soluble and, for such markets, pass Tappi Useful Method 213 (Tappi UM213) "Repulpability of Splice Adhesive Compositions," incorporated herein by reference.

Other markets which utilize hot water or alkali for repulping accept a different standard. A product which passes a Tappi Useful Method 204 (Tappi UM 204), a de-inking and repulping test incorporated herein by reference will also satisfy requirements for elevated temperature alkali repulping.

Commercial water-soluble splicing tape products while they may pass such tests have suffered from (a) poor shelf life; (b) poor humidity and/or heat-aged performance; and (c) a propensity to bleed into the paper facestock (which reduces peel performance). Each of these problems is related to the high water-sensitivity of the adhesive used in the tape products. For these reasons the tape is sold in a sealed plastic bag. Such water-soluble adhesives and tapes are described, for instance, in U.S. Pat. No. 3,441,430 to Peterson; U.S. Pat. No. 3,865,770 to Blake, U.S. Pat. No. 4,052,368 to Larson, U.S. Pat. No. 4,413,080 to Blake, and U.S. Pat. No. 4,569,960 also to Blake, each incorporated herein by reference.

A need exists to provide a splicing tape adhesive and tape construction which are repulpable and not sensitive to changes in relative humidity and where no special precautions are required for storage or use.

SUMMARY OF THE INVENTION

According to the present invention, there is provided an adhesive system for splicing tapes and a splicing tape product.

The adhesive for the splicing tape comprises from about 45% to about 97% by weight of an inherently tacky water-dispersible pressure-sensitive adhesive formed by emulsion polymerization of from about 55% to about 90% by weight of nonacid monomers, predominantly alkyl acrylates, interpolymerized with from about 10% to about 20% of at least one carboxylic acid preferably a mixture of acrylic acid and at least one oleophilic unsaturated carboxylic acid, more preferably a mixture of acrylic acid with methacrylic acid and from 0 to about 15% by weight of at least one vinyl ester and from 0 to about 15% by weight methyl acrylate, with some portion of the polymerization occurring in the presence of a chain transfer agent, from 0 to about 35% by weight of a low Tg acrylic adhesive polymer having a glass transition temperature less than −50° C. and from about 3% to about 20% by weight of a compatible plasticizer. The repulpable pressure-sensitive adhesive constituent of the mixture has a glass transition temperature in the range of about −15° to −50° C. and is preferably formed in the presence of a mixture of nonionic and anionic surfactants.

Useful repulpable pressure-sensitive adhesive polymers may be prepared by one stage emulsion polymerization, sequential polymerization or by blending separately formed emulsion polymers. Sequential emulsion polymerization is preferred.

The splicing tape adhesive composition has repulpable properties as set by Tappi UM204. The adhesives may also pass Tappi UM 213.

The presently preferred water-dispersible pressure-sensitive adhesive polymer systems of the invention are preferably based on a copolymer of 2-ethylhexyl acrylate, methyl acrylate, vinyl acetate, methacrylic acid and acrylic acid in which the acid content is from about 10% to about 20% by weight of the polymer and acrylic acid comprises from about 30% to about 90% by weight of the total unsaturated carboxylic acids, formed by sequential polymerization in which about 40% to 80% of the monomers are polymerized in a first stage, followed by addition of the balance of the monomers. Sequential polymerization appears to provide the best balance of adhesive properties, dispersibility and humidity resistance.

Some portion of the preferred adhesive polymers used as a repulpable product is polymerized in the presence of from about 0.5% to about 1.5% by weight of the monomers of a chain transfer agent, preferably n-dodecyl mercaptan. There may be optionally added an internal crosslinker during polymerization or, after polymerization, an external crosslinker to enhance cohesive strength and reduce paper bleed.

The preferred repulpable pressure-sensitive adhesive polymers contain about 55% to about 90% by weight of an alkyl acrylate containing from 4 to about 8 carbon atoms in the alkyl group, from about 1% to about 15% by weight methacrylic acid, about 5% to about 19% by weight acrylic acid, from 0% to about 15% by weight vinyl acetate, and from 0% to about 15% by weight methyl acrylate formed in the presence of 0% to 1.5% by weight of the monomers of n-dodecyl mercaptan and from about 0% to 5% of the weight of the monomers of aluminum acetate as the external crosslinker and/or an internal crosslinker.

The presently preferred repulpable pressure-sensitive adhesive composition is a mixture of about 85.5% by weight of a sequentially polymerized polymer system containing about 60% by weight 2-ethylhexyl acrylate, about 12.5% by weight vinyl acetate, about 12.5% by weight methyl acrylate, about 11.25% by weight acrylic acid and about 3.75% by weight methacrylic acid, sequentially polymerized with about 60% 2-ethylhexyl acrylate, about 12.5% by weight vinyl acetate, about 15% by weight acrylic acid and about 12.5% by weight methyl acrylate.

This repulpable adhesive comprises about 71% by weight of a mixture containing the repulpable adhesive, about 24% by weight acrylic emulsion polymer and about 5% by weight ethylene glycol di-2-ethylhexoate.

The adhesive is coated, typically to a coat weight of 50 to 60 g/m² onto a release coated side of a backing and to a 10 pound tissue which is bonded to another adhesive layer which is in turn adhered to a second release coating on a backing. The release coatings may have differential release so that the construction always splits in the same way.

DETAILED DESCRIPTION

The present invention relates to water-dispersible inherently tacky pressure-sensitive adhesive polymer systems for splicing tape applications and splicing tapes formed, therefrom.

The splicing tape adhesive compositions are formed of about 97% to about 45% by weight of water-dispersible inherently tacky pressure-sensitive adhesive of about 3% to about 20% by weight of a compatible plasticizer and from 0% to about 35% by weight of a low Tg soft acrylic polymer.

The water-dispersible pressure-sensitive adhesive component of the invention is preferably prepared by batch (single stage) or sequential polymerization or by blending of batch polymers. Glass transition temperature as measured by DSC (Differential Scanning Colorimetry) of the final polymer or blend of polymers is in the range from about −15° C. to −50° C. Repulpability requires limiting molecular weight of some amount of the polymer. This may be accomplished by utilizing as the adhesive polymer or a component of a polymer blend, an adhesive polymer formed in the presence of a chain transfer agent, preferably n-dodecyl mercaptan, at a concentration providing a net polymer blend having a good balance of dispersibility, pressure-sensitive adhesive performance, humidity resistance and a resistance to bleed.

The emulsion formed dispersible pressure-sensitive adhesives of the instant invention contain, on a percent by weight basis, from about 55 to about 90% by weight total of one or more alkyl acrylates containing from 4 to about 8 carbon atoms in the alkyl group. Useful alkyl acrylates include n-butyl acrylate, 2-ethylhexyl acrylate, isooctyl acrylate, and the like, as well as mixtures thereof.

Other modifying monomers may be effectively employed so long as the glass transition temperature of the final adhesive remains in the range of from about −15° C. to −50° C. Representative modifying monomers include lower alkyl acrylate such as a methyl acrylate; vinyl esters, such as vinyl acetate, vinyl butyrate, vinyl propionate, vinyl isobutyrate, vinyl valerate, vinyl versitate, and the like; and diesters of an unsaturated dicarboxylic acid and mixtures thereof, such as di-2-ethylhexyl maleate, di-2-ethylhexyl fumarate, and dibutyl fumarate and the like.

When employed, vinyl acetate and methyl acrylate improve the hydrophilic characteristic of the polymers, with methyl acrylate further acting to improve cohesive strength. Vinyl acetate and methyl acrylate are each employed in a concentration of 0% to 15% by weight, and preferably in equal amounts.

Other preferred acrylate monomer combinations system employ a mixture of 2-ethylhexyl acrylate and butyl acrylate with the preferred ratio of 2-ethylhexyl acrylate to butyl acrylate being about 3 to 1.

The essential component of the repulpable polymers is at least one and preferably a blend of carboxylic acid monomers, preferably a blend of acrylic acid with at least one unsaturated oleophilic carboxylic acid, such as methacrylic acid and itaconic acid and the like, with a ratio of acrylic acid to oleophilic acid being from about 2:3 to about 7:1. The total carboxylic acid content of the polymer is from 10% to about 20% by weight. Blends of acrylic acid and methacrylic acid are preferred in which acrylic acid is present in a concentration of about 5% to about 19% by weight of the polymer and methacrylic acid is employed in a concentration of about 1% to about 15% weight of the polymer.

By the term "oleophilic" carboxylic acid as used herein there is meant unsaturated carboxylic acids which are more soluble in the monomeric oil phase of the emulsion than acrylic acid.

In all emulsion polymerization systems, monomers homopolymerize and copolymerize. We have found that an oleophilic unsaturated carboxylic acid, such as methacrylic acid, is not only preferentially soluble in and copolymerizes with alkyl acrylates, but enhances the solubility of acrylic acid in such monomers to promote copolymerization of acrylic acid with the alkyl acrylates.

When employed, butyl acrylate adds stiffness to the copolymer, methacrylic acid promotes acrylic acid copolymerization, and acrylic acid enhances adhesion to polar surfaces.

All or a portion of the emulsion pressure-sensitive adhesive polymers used in the instant invention are prepared in the presence of a chain transfer agent present in an amount of from about 0.5% to about 1.5% by weight of the monomers, preferably from about 0.75% to about 1.25% by weight of the monomers. The preferred chain transfer agent is n-dodecyl mercaptan or t-dodecyl mercaptan.

The repulpable emulsion pressure-sensitive adhesive polymers are prepared by providing an initial charge to a polymerization reactor of an aqueous solution containing a nonionic surfactant which is preferably an ethoxylated rosin acid emulsifier, most preferably an ethoxylated rosin acid emulsifier containing about 15 ethylene oxide groups per molecule. There is added to the initial charge in the reactor a small amount of the monomers separately prepared in a pre-emulsion containing anionic surfactant, preferably a sulfated ethoxylated nonylphenol containing about 4 ethylene oxide units per molecule and a free radical initiation system. The presently preferred nonionic surfactant is AR-150 manufactured and sold by Hercules. The presently preferred anionic surfactant is Alipal CO-436 manufactured by Rhone Poulenc. The amount of nonionic surfactant employed may be from about 4% to about 8% by weight of the initial reactor charge, with anionic surfactant concentration being from about 2.5% to about 5% by weight of the monomers in the pre-emulsion.

The reaction is redox initiated and the remaining pre-emulsified monomers are added incrementally i.e., intermittently or continuously over a period of time.

While, as previously indicated, the monomers can be added in one pre-emulsion charge, it is preferred that the monomers be sequentially added. It is presently preferred that from about 40% to about 80% of the total monomers be incrementally added to the initial charge and essentially totally reacted following by the incremental addition of the remainder of the monomers in a second pre-emulsion for reaction in the reactor. Excellent results have been obtained in sequential polymerization where the first charge of monomers contains about 15% to 20% by weight carboxylic acid, and the second charge of monomers contains about 10% to 25% by weight carboxylic acid. Independent of the amount of acid employed in any given charge, the net repulpable product should contain about 10% to about 20% by weight polymerized carboxylic acids in which acrylic acid is present in an amount from about 30 to about 90% by weight of the carboxylic acids.

In general that the amount of chain transfer agent employed provides a tradeoff between dispersibility, adhesive performance and humidity resistance, with the amount of chain transfer agent employed being inversely proportional to the amount of acid in the charge. It is believed the presence of high level of carboxylic acid in the polymer enhances water-dispersibility, and therefore the polymer can have a higher molecular weight. This allows a reduction in the amount of chain transfer agent employed. At lower carboxylic acid concentrations, the polymer is less dispersible, and therefore more chain transfer agent is required to reduce molecular weight. As molecular weight is reduced, the tendency of the polymer to migrate into a porous paper facestock is increased. This enhances, for some applications, the desirability of adding to the monomers an internal crosslinker such as diallyl maleate or an external crosslinker such as aluminum acetate. With the external crosslinker, crosslinking occurs after polymerization. Crosslinkers may be used in a concentration of up to about 1% by weight of the monomers, typically from about 0.2% to about 0.6% by weight of the monomers.

Water-dispersible pressure-sensitive adhesive polymers prepared by emulsion polymerization are described in detail herein. To be satisfactory, at least one polymer component of a composition must pass a wash-off screening test. In this test, the adhesive is coated onto a 2 mil polyester film at a coat weight of 20–25 g/m$^2$, dried in an oven at 70° C. for 15 minutes, cooled to room temperature, and then held under a water tap to determine if the adhesive turns milky. If so, then the adhesive has the ability to be dispersed or re-emulsified or washed from a surface. This may also be established by placing a sample in a beaker of water and allowing the sample to stand to determine if the water in the beaker turns milky. A third screening test is to simply place drops of water on the adhesive surface and rub the water into the surface. If the water turns milky the adhesive is probably dispersible.

The following Examples and Controls illustrate the useful water-dispersible pressure-sensitive adhesives. In respect to Tables IV and V, "E" means an Example representative of the invention; "C" means Control; a formulation which did not pass criteria for dispersibility; including a wash-off ("WO") screening test. The requirement for ultimate re-pulpability means passing of TAPPI UM 213 and/or UM 204. A requirement for being useful as a pressure-sensitive adhesive is passing, or at least marginally passing, a cardboard adhesion ("CA") test which is a manual looptack adhesion to recycled cardboard. In respect to Tables IV and V "EHA" means 2-ethylhexyl acrylate, "BA" means butyl acrylate, "VA" means vinyl acetate, "MA" means methyl acrylate, "MAA" means methacrylic acid, "AA" means acrylate acid, "DAM" means diallyl maleate, "DDM" means n-dodecyl mercaptan. "A" means single incremental addition polymerization, "S" means sequential, two stage incremental addition polymerization, and "B" means a blend of two separate "A" type polymers. With respect to an Example or Control involving sequential polymerization or a blend ("a") means the composition of the first stage pre-emulsion monomer addition or the first polymer of a blend of polymers and ("b") means the composition of the second stage of pre-emulsion monomer additional or the second polymer of a blend. AR-150 is a nonionic ethoxylated rosin acid emulsifier manufactured by Hercules and containing approximately 15 units of ethylene oxide per molecule. Alipal CO-436 is manufactured and sold by Rhone Poulenc and is a sulfonated ethoxylated nonylphenol containing 4 units of ethylene oxide per molecule. Triton X-100 is a octylphenoxy polyethoxyethanol nonionic surfactant having a HLB value of 13.5 and Triton X-165 is a nonionic octylphenoxy polyethoxyethanol having a HLB value of 15.8 both are manufactured by Union Carbide. Vinol (now AIRVOL 203) is a polyvinyl alcohol protective colloid manufactured and sold by Air Products, Inc. In terms of performance, "F" means fail, "P" means pass, and "M" means marginal. 50# EDP means electronic data alkaline processed paper at a 50 pound per ream weight. "WO" means wash-off in one or all combinations of three tests described above. "CA" Cardboard Looptack Adhesion by the manual test. "OB" means an overnight bleed test to determine if at 50° C., the adhesive migrates into and produce a visible stain on 50# EDP paper. "HH" means high humidity and again a visible stain on exposure to 90% humidity, at 25° C. for one week. Pass in any bleed test means no visible stain. "Tappi" means TAPPI UM213 and/or 204.

Tappi UM 204 is a quick laboratory test to determine if waste paper will be deinked using as reagents sodium hydroxide flakes and soda bleach (NaOCl) containing 30 grams available chlorine per 1000 mL, i.e., 3% bleach.

Representative samples of the mixed waste papers are torn into specimen of approximately 2.5 cm (1-in.) squares and add to a 600-mL beaker containing 0.8 g of NaOH in 250 mL of hot water (at about 88° C.). The beaker is placed on a hot plate and its contents maintained a temperature between 88° C. and a low boil for 10 min. The contents are then transferred to a blender and mixed at a high speed for 30 seconds. After 10 seconds, the blender is stopped and the paper hung on the sides of the container is loosened with a glass rod. The suspension is drained onto a 15.2-cm (6 in.) 60 mesh sieve or screen and washed as follows: Stir the pulp into a beaker with 500 mL of fresh water, using a stirring rod and again drain on the sieve. Repeat twice more.

Use 400 mL of the pulp suspension to make a handsheet drain 400 mL of the pulp drained on a 60-mesh sieve, transferred to a 150-mL beaker, to which there is added 4 mL of a 3% bleach solution, i.e., NaOCL containing 30 g Cl$_2$ per 1000 mL. Make sure mixture is blended properly by pouring and slowly stirring into a second beaker. Complete blending by similarly pouring back into the first beaker. This beaker is covered with the watch glass and held at 43° C. for 4 hours. A handsheet is made from the bleached pulp.

The remaining 200 mL of pulp suspension is poured into a shallow black pan and inspected for visible nonfibrous particles and for bits of undefibered paper. Remove any observed from the suspension and placed on a blotter for inspection and identification.

Both handsheets, both wet and dry, are observed for general color and cleanliness, using both reflected and transmitted light. They are observed for the presence and nature of bits of undefibered paper, and of the nonfibrous fibrous particles taken from the shallow pan. Inspection should indicate if there is any wet-strength paper, plastic, or rubbery fragments, ink spots or other objectionable particles.

A brightness test is run on the two dried handsheets.

In Tappi UM 213 sample squares repulpability of splices/splicing tape. Sample squares are placed in a blender with 500 mL of room temperature water. The blender is run for 20 seconds at low speed (approximately 15,000 rpm). The blender is stopped at 1 min. and a stock which splatters up the sides or onto the cover is washed back into the mixer with a wash bottle. After a 1 min. rest, the blender is again run for 20 seconds and washed down over a 1 min. period and the blender is run for a final 20 second cycle.

The stock is then removed from the blender and made into handsheets and the handsheets pressed between dry blotters for removal of excess water. Pressing is for 30 seconds. The sheets are removed from the blotters and dried and examined using direct and transmitted light for particles of unrepulped splicing tape.

Examples 1–8 and Controls 1–5 are for compositions involving single-stage polymerization where monomers in the weight percent shown were polymerized in a single stage by addition of a pre-emulsion containing Alipal CO 436 as the surfactant in the concentration shown to a reactor containing an initial charge of water, AR-150 as the surfactant, and ferric ethylenediaminetetraacetic acid and potassium persulfate in amounts shown below.

The presently preferred polymerization procedure involving sequential addition of monomers pre-emulsions and is specific for adhesive of Examples E-10 as well as general to Examples E-9 to 11 and Controls C-6 to C-9.

To a reaction vessel there was added materials shown in Table I.

TABLE I

| Component | Grams |
| --- | --- |
| WATER | 150 |
| AR-150 | 40 |
| Fe EDTA[1] | 0.1 |

[1]Fe EDTA - Ferric salt of ethylenediaminetetraacetic acid.

The mixture was heated to 70° C. and treated with hydrogen peroxide for one half hour, then allowed to cool to 50° C. at which time there was added 3 grams $K_2S_2O_8$ and 9 grams of $NaHCO_3$.

There was separately formed, a pre-emulsion of the composition shown in Table II.

TABLE II

| Ingredient | % Monomers | Grams |
| --- | --- | --- |
| Water | | 255 |
| Alipal CO-436 (60%) | | 40 |
| $K_2S_2O_8$ | | 2.4 |
| 2EHA | 61 | 384 |
| BA | 20.3 | 128 |
| MAA | 12.2 | 76.8 |
| AA | 6.5 | 41.2 |
| Catalyst, tertiarybutylhydroperoxide(t-BHP) | | 7.2 |
| Chain transfer agent, n-dodecyl mercaptan (n-DDM) | | |

There is also formed a second pre-emulsion of the composition shown in Table III.

TABLE III

| Ingredient | % Monomers | Grams |
| --- | --- | --- |
| Water | | 75 |
| Alipal CO436 (60%) | | 10 |
| $K_2S_2O_8$ | | 0.6 |
| 2EHA | 58.2 | 96 |
| BA | 29.1 | 48 |
| MAA | 8.8 | 14.6 |
| AA | 3.9 | 6.4 |
| t-BHP | | 0.6 |
| n-DDM | | 1.8 |

50 grams of the first pre-emulsion was charged to the reactor at 50° C. and the balance incrementally added over a two hour period. Following completion of addition of the first pre-emulsion there was started the incremental addition of the second pre-emulsion over a one hour period. The properties of the polymer formed are shown in Example 10 of Table IV.

TABLE IV

| | % BY WGT | | | | | | % |
| --- | --- | --- | --- | --- | --- | --- | --- |
| E/C | EHA | BA | MAA | AA | DDM | MODE | POLYMER |
| E-1 | 60 | 20 | 12 | 8 | 0.50 | A | 100 |
| E-2 | 60 | 20 | 12 | 8 | 1.00 | A | 100 |
| E-3 | 60 | 20 | 12 | 8 | 1.50 | A | 100 |
| C-1 | 60 | 30 | 6 | 4 | 0.00 | A | 100 |
| C-2 | 60 | 30 | 6 | 4 | 0.25 | A | 100 |
| E-4 | 60 | 30 | 6 | 4 | 0.25 | A | 100 |
| E-5 | 60 | 30 | 6 | 4 | 0.50 | A | 100 |
| E-6 | 60 | 30 | 6 | 4 | 0.50 | A | 100 |
| E-7 | 60 | 20 | 8 | 12 | 1.50 | A | 100 |
| E-8 | 60 | 30 | 4 | 6 | 0.50 | A | 100 |
| C-3 | 60 | 30 | 6 | 4 | 0.50 | A | 100 |
| C-4 | 60 | 30 | 6 | 4 | 0.25 | A | 100 |
| C-5 | 60 | 30 | 6 | 4 | 0.50 | A | 100 |
| E-9(a) | 61.0 | 20.3 | 12.2 | 6.5 | 1.14 | S | 80 |
| (b) | 58.2 | 29.1 | 8.8 | 3.9 | 1.09 | S | 20 |
| E-10(a) | 61.0 | 20.3 | 12.2 | 6.5 | 0.80 | S | 80 |
| (b) | 58.2 | 29.1 | 8.8 | 3.9 | 0.76 | S | 20 |
| C-6(a) | 61.0 | 20.3 | 12.2 | 6.5 | 0.57 | S | 80 |
| (b) | 58.2 | 29.1 | 8.8 | 3.9 | 0.54 | S | 20 |
| C-7(a) | 61.0 | 20.3 | 12.2 | 6.5 | 1.14 | S | 80 |
| (b) | 58.2 | 29.1 | 8.8 | 3.9 | 1.09 | S | 20 |

TABLE IV-continued

| E/C | | | | | | | |
|---|---|---|---|---|---|---|---|
| E-11(a) | 61.0 | 20.3 | 12.2 | 6.5 | 1.14 | S | 80 |
| (b) | 58.2 | 29.1 | 8.8 | 3.9 | 1.09 | S | 20 |
| C-8(a) | 61.0 | 20.3 | 12.2 | 6.5 | 0.00 | S | 80 |
| (b) | 58.2 | 29.1 | 8.8 | 3.9 | 0.00 | S | 20 |
| C-9(a) | 61.0 | 20.3 | 12.2 | 6.5 | 0.00 | S | 80 |
| (b) | 58.2 | 29.1 | 8.8 | 3.9 | 2.18 | S | 20 |
| C-10(a) | 60 | 20 | 12 | 8 | 1.00 | B | 50 |
| (b) | 60 | 30 | 6 | 4 | 0.25 | B | 50 |
| E-12(a) | 60 | 20 | 12 | 8 | 1.00 | B | 85 |
| (b) | 60 | 30 | 6 | 4 | 0.25 | B | 15 |
| E-13(a) | 60 | 20 | 12 | 8 | 1.00 | B | 90 |
| (b) | 60 | 30 | 6 | 4 | 0.25 | B | 10 |
| E-14(a) | 60 | 20 | 12 | 8 | 1.00 | B | 95 |
| (b) | 60 | 30 | 6 | 4 | 0.25 | B | 5 |

| | INITIAL | | PRE EMULSION | | TEST RESULTS | | | |
|---|---|---|---|---|---|---|---|---|
| E/C | SURFACTANT | % | SURFACTANT | % | WO | CA | OB | HH |
| E-1 | AR-150 | 5.00 | CO-436 | 3.75 | M | P | P | P | F |
| E-2 | AR-150 | 5.00 | CO-436 | 3.75 | P | P | P | P/M | P |
| E-3 | AR-150 | 5.00 | CO-436 | 2.52 | P | P | P | F | P |
| C-1 | AR-150 | 5.00 | CO-436 | 2.75 | F | — | P | — | — |
| C-2 | AR-150 | 7.50 | CO-436 | 2.52 | M | — | P | — | — |
| E-4 | AR-150 | 5.00 | CO-436 | 2.52 | M | P | P | P | M |
| E-5 | AR-150 | 7.50 | CO-436 | 3.75 | M | M | P | F | M |
| E-6 | AR-150 | 5.00 | CO-436 | 2.52 | P | P | P | F | P |
| E-7 | AR-150 | 5.00 | CO-436 | 3.75 | P | P | F | F | P |
| B-8 | AR-150 | 1.25 | CO-436 | 3.50 | P | P | P | F | P |
| C-3 | Vinol | 7.50 | CO-436 | 2.25 | F | — | — | — | — |
| C-4 | Vinol | 10.00 | CO-436 | 3.00 | M | — | F | — | — |
| C-5 | Vinol | 10.00 | CO-436 | 3.00 | M | — | F | — | — |
| E-9(a) | AR-150 | 5.00 | CO-436 | 3.80 | P | P | P | F | P |
| (b) | AR-150 | 5.00 | CO-436 | 3.60 | | | | | |
| E-10(a) | AR-150 | 5.00 | CO-436 | 2.66 | P | P | P | M | P |
| (b) | AR-150 | 5.00 | CO-436 | 2.52 | | | | | |
| C-6(a) | AR-150 | 5.00 | CO-436 | 1.90 | M | P | P | M+ | F |
| (b) | AR-150 | 5.00 | CO-436 | 1.80 | | | | | |
| C-7(a) | Triton X165 | 5.00 | CO-436 | 3.80 | M | M | — | M | — |
| (b) | Triton X165 | 5.00 | CO-436 | 3.60 | | | | | |
| E-11(a) | Triton X165 | 5.00 | CO-436 | 3.80 | P | M | — | M | — |
| (b) | Triton X165 | 5.00 | CO-436 | 3.60 | | | | | |
| C-8(a) | None | 0.00 | CO-436 | 3.80 | F | — | — | — | — |
| (b) | None | 0.00 | CO-436 | 3.60 | | | | | |
| C-9(a) | None | 0.00 | CO-436 | 3.80 | F | — | — | — | — |
| (b) | None | 0.00 | CO-436 | 3.60 | | | | | |
| C-10(a) | AR-150 | 5.00 | CO-436 | 3.75 | — | P | P | P | F |
| (b) | AR-150 | 7.50 | CO-436 | 2.52 | | | | | |
| E-12(a) | AR-150 | 5.00 | CO-436 | 3.75 | — | M | P | P | P |
| (b) | AR-150 | 7.50 | CO-436 | 2.52 | | | | | |
| E-13(a) | AR-150 | 5.00 | CO-436 | 3.75 | — | M | P | F | P |
| (b) | AR-150 | 7.50 | CO-436 | 2.52 | | | | | |
| E-14(a) | AR-150 | 5.00 | CO-436 | 3.75 | — | M | P | F | P |
| (b) | AR-150 | 7.50 | CO-436 | 2.52 | | | | | |

The chain transfer agent level is also used to ensure repulpability while maintaining adhesive performance. An excess of the amount of chain transfer agent results in polymers with poor adhesive properties. Too little chain transfer agent results in an inability to repulp the adhesive polymer. Increasing the amount of chain transfer agent reduces the polymer molecular weight and conversely decreasing the amount of chain transfer agent increases the polymer molecular weight. One could also increase or decrease polymer molecular weight by other means such as changing polymerization temperature to achieve adequate dispersibility.

On the average, the amount of n-dodecyl mercaptan found to be most functional is about 1%±0.5% by weight based on the total weight of the monomers.

For Examples E-12 to E-14 and Control 10 blends of polymers were used, each polymer being polymerized in a manner used for individual polymerization. The individual polymers were blended in a proportion of 50% to 95% (a) polymer and 50 to 5% (b) polymer. As indicated by Table IV the presence of dodecyl mercaptan at about 0.5% for a single batch polymerization was marginal as to utility of the product and at 1.5% marginal with respect to utility as to bleed. To our surprise, however, two stage sequential monomers addition provided a more aggressive adhesive than a blend of polymers and allowed a reduction of n-dodecyl mercaptan to achieve the same overall adhesive performance.

Using a sequential polymerized procedure as generally set forth above, the polymers of the Example E-15 to E-19 were prepared with the relative proportions of monomer and polymer properties set forth in Table V.

TABLE V

| Examples | E-15 | E-16 | E-17 | E-18 | E-19 |
|---|---|---|---|---|---|
| Sequential Polymerization Monomers | yes | yes | yes | yes | yes |
| Ratio 1st stage/2nd stage | ⅔ | ⅔ | ⅔ | ⅔ | ⅔ |
| 1st Stage, Wt % Monomer | | | | | |
| 2-EHA | 60 | 60 | 60 | 60 | 72.4 |
| VAc | 12.5 | 12.5 | 12.5 | 12.5 | 13.7 |
| MA | 12.5 | 12.5 | 12.5 | 12.5 | 13.7 |
| AA | 11.25 | 11.25 | 11.25 | 11.25 | |
| MAA | 3.75 | 3.75 | 3.75 | 3.75 | |
| DAM | 0 | 0 | 0 | 0 | 0.2 |
| n-DDM | 0 | 0 | 0 | 0 | 0 |
| 2nd Stage, Wt % Monomer | | | | | |
| 2-EHA | 60 | 60 | 60 | 60 | 34.4 |
| VAc | 12.5 | 12.5 | 12.5 | 12.5 | 27.9 |
| MA | 12.5 | 12.5 | 12.5 | 12.5 | 27.9 |
| AA | 15 | 15 | 15 | 15 | 7.8 |
| MA | 0 | 0 | 0 | 0 | 2.0 |
| n-DDM | 0.3 | 0.3 | 0.66 | 0.83 | 2.2 |
| Cold Water Wash-off | good | good | good | good | good |
| Cardboard Adhesion | good | good | good | good | marginal |
| Shear 500 g wt ¼ sin 2 mil Mylar film | 71 min c/p | 180 min c/p | 142 min c/p | 68 min | 14 min |
| 2 mil Mylar film 90% RH, 40° C. | | marginal | marginal | marginal | |
| TAPPI UM 204 | pass | pass | pass | pass | pass |
| Comments | rxn temp 50–55° C. | rxn temp 68–72° C. | rxn temp 68–72° C. | rxn temp 68–72° C. | rxn temp 68–72° C. |
| Solids (%) | 50 | | | | |
| Viscosity (cP) | 7000 | | | | | rxn = polymerization temperature

At acid levels below 10%, the adhesives were inherently more tacky and showed good humidity performance i.e. no bleed under identical storage conditions. However, these systems were not repulpable by Tappi UM213 methodology.

Blending the polymers at (MAA/AA 20% and 10%) at polymer ratios of 80:20 to 95:5 gave products that marginally passed Tappi UM 213 with improved looptack Blending the polymers at (MAA/AA 20% and 10%) at polymer ratios of 80:20 to 95:5 gave products that marginally passed Tappi UM 213 with improved looptack adhesion to cardboard and improved bleed performance under high humidity exposure.

Individual polymers which do not pass Tappi UM 213 may pass Tappi UM 204 and are useful in markets where hot alkali repulping is employed, also polymers when blended with a polymer which passes UM 213 may in the combination, pass UM 213.

For instance, the sequentially polymerized E-8 above passed Tappi 204 and exhibits acceptable high-humidity bleed resistance on 50#EDP paper. Similarly, the blends of polymers E-10 (a) and (b) in proportion 80:20, when further blended with a polymer of 56.8% (weight basis) 2-EHA, 37.9% BA, 2.8% MAA, 1.9% AA, and 0.6% itaconic acid and formed in the absence of a chain transfer agent ("Polymer B" herein) when blended in proportion of 80-20, 70-30 and 60-40, pass Tappi UM204 and high-humidity bleed at 25° C. (50#EDP) and are part of this invention.

The second component of the dispersible, compatible adhesives of the invention is a plasticizer present in amount about 20%, preferably from about 3% to about 10% by weight, more preferably, from about 3% to about 5% by weight of the combination. As useful compatible plasticizers there may be mentioned dioctyl azelate, trimethylene glycol di-2-ethylhexoate, acetyl tributyl citrate, dibutyl phthalate, di-isobutyl adipate, tri-2-ethylhexyl phosphate and the like. Ethylene glycol di-2-ethylhexoate is presently preferred in a concentration between about 3% to about 5% by weight.

The third component of the composition is a low glass transition temperature acrylic polymer present in an amount from 0 to about 25% by weight of the composition. The preferred acrylic polymer include homopolymers of 2-ethylhexyl acrylate and a copolymer of 2-ethylhexyl acrylate with up to about 5% by weight of a carboxylic acid.

The presently preferred acrylic polymer is one containing 98% by weight 2-ethylhexyl acrylate, 1.5% methacrylic acid and 0.5% acrylic acid.

The presently preferred composition of the invention is one containing what is listed in Table VI.

TABLE VI

| INGREDIENT | PARTS BY WEIGHT |
|---|---|
| E-18 emulsion polymer | 71.42 |
| 98% 2 ERA/11.5% HAA/0.5% AA | 23.81 |
| Trimethylene Glycol di-2-ethyl hexoate | 4.76 |

The splicing tape laminates of the instant invention are formed by providing a backing having a first release layer on one surface of the paper or other backing, laminating the release layer on one surface of a layer to an adhesive system of the instant invention applied at a coat weight of 50 to 60 grams per square meter preferably about 56 grams per square meter. The applied or second surface of the adhesive layer is bonded to a 10 pound tissue which is in turn bonded to a second layer of the adhesive applied to the same coat weight which is in turn bonded to a second release layer of coating having a release different from the first release coating on a support backing for the release coating. The release coatings may have differential release so that the construction will always debond in the same way.

In use the one backing is peeled from a roll of the laminate exposing one of the adhesive surfaces. The tape is bonded to the roll of newspaper stock and the other backing peeled away exposing the adhesive. As a roll of paper comes to its end the adhesive on the fresh roll is spliced to the dispersing paper while both rolls of paper are moving at the same time forming a continuous web of paper. are moving at the same time forming a continuous web of paper.

An adhesive formulation tested was one containing 85 parts by weight of the adhesive of Example E-18, 5 parts by weight of polymer B and 10 parts of weight by Snowtack 6085, a tackifier which raises glass transition temperature.

The construction, when tested on news stock, failed to make a flying splice test in two trial attempts.

The splice adhesive was reformulated to one containing the adhesive system of Table VI which gave a softer product and a splicing tape which successfully passed the flying splice test.

What is claimed is:

1. A splicing tape comprising:
   a. a first backing layer providing opposed first and second surfaces and having on one surface thereof a first release coating;
   b. a first pressure-sensitive adhesive layer having opposed first and second surfaces in which the first surface thereof is releasably bonded to the first release coating;
   c. a tissue support layer providing opposed first and second surfaces in which the first surface is bonded to the second surface of the first pressure-sensitive adhesive layer;
   d. a second pressure-sensitive adhesive layer having opposed first and second surfaces, the first surface of the second pressure-sensitive adhesive layer being bonded to the second surface by the tissue support layer; and
   e. a second backing layer providing opposed first and second surfaces and having one surface thereof a second release coating releasably bonded to the second surface of the second pressure-sensitive adhesive layer; and wherein said first and second pressure-sensitive adhesive layers are water-dispersible, inherently tacky pressure-sensitive adhesives comprising from about 97% to about 45% by weight of a tacky emulsion polymer formed from about 55% to 90% by weight of a first monomer which is at least one alkyl acrylate containing from 4 to about 8 carbon atoms in the alkyl group, from about 10% to about 20% by weight of at least one unsaturated carboxylic acid, from 0% to about 15% by weight of at least one vinyl ester, and from 0% to about 15% by weight methyl acrylate, said emulsion polymer being formed in the presence of anionic and nonionic surfactants, said polymer having a glass transition temperature of about −15° to about −50° C., and formed in the presence of a sufficient amount of chain transfer agent to provide an emulsion polymer which, when coated onto a repulpable paper substrate, is water-dispersible and passes Tappi Useful Method 204; from 0 to about 25% by weight of an acrylic polymer having a glass transition temperature of less than −50° C. and from about 3% to about 20% by weight of a plasticizer which is compatible with the emulsion and acrylic polymers and which is releasable from the first and second release coatings, said pressure-sensitive adhesive composition having, at a coat weight of 50 to 60 grams per sq. meter, an adhesivity sufficient to pass a flying splice test.

2. A splicing tape as claimed in claim 1 in which the acrylic polymer is a copolymer containing 98% by weight 2-ethylhexyl acrylate, 1.5% by weight methacrylic acid and 0.5% by weight acrylic acid.

3. A splicing tape as claimed in claim 1 in which the emulsion polymer comprises a first polymer containing 60% by weight 2-ethylhexyl acrylate, about 12.5% by weight vinyl acetate, about 12.5% by weight methyl acrylate, about 11.25% by weight acrylic acid and about 3.75% by weight methacrylic acid sequentially polymerized with a monomer system comprising about 60% by weight 2-ethylhexyl acrylate, about 12.5% by weight vinyl acetate, about 15% by weight acrylic acid and about 12.5% by weight methyl acrylate.

4. A splicing tape comprising:
   a. a first backing layer providing opposed first and second surfaces and having on one surface thereof a first release coating;
   b. a first pressure-sensitive adhesive layer having opposed first and second surfaces in which the first surface thereof is releasably bonded to the first release coating;
   c. a tissue support layer providing opposed first and second surfaces in which the first surface is bonded to the second surface of the first pressure-sensitive adhesive layer;
   d. a second pressure-sensitive adhesive layer having opposed first and second surfaces, the first surface of the second pressure-sensitive adhesive layer being bonded to the second surface by the tissue support layer; and
   e. a second backing layer providing opposed first and second surfaces and having one surface thereof a second release coating releasably bonded to the second surface of the second pressure-sensitive adhesive layer; and wherein said first and second pressure-sensitive adhesive layers comprise:
   i. about 71% by weight of a first emulsion polymer containing 60% by weight 2-ethylhexyl acrylate, about 12.5% by weight vinyl acetate, about 12.5% by weight methyl acrylate, about 11.25% by weight acrylic acid and about 3.75% by weight methacrylic acid sequentially emulsion polymerized with a monomer system comprising about 60% by weight 2-ethylhexyl acrylate, about 12.5% by weight vinyl acetate, about 15% by weight acrylic acid and about 12.5% by weight methyl acrylate, said sequential polymerization occurring in the presence of n-dodecyl mercaptan present in an amount sufficient to make the polymer pass Tappi Useful Method 204;
   ii. about 24% by weight of an acrylic emulsion polymer formed of about 98% by weight 2-ethylhexyl acrylate about 1.5% by weight methacrylic acid and about 0.5% by weight acrylic acid; and
   iii. about 5% by weight triethylene glycol d-2-ethylhexoate; and which is releasable from the first and second release coatings.

5. A splicing tape comprising:
   a. a first backing layer providing opposed first and second surfaces and having on one surface thereof a first release coating;
   b. a first pressure-sensitive adhesive layer having opposed first and second surfaces in which the first surface thereof is releasably bonded to the first release coating;

c. a tissue support layer providing opposed first and second surfaces in which the first surface is bonded to the second surface of the first pressure-sensitive adhesive layer;

d. a second pressure-sensitive adhesive layer having opposed first and second surfaces, the first surface of the second pressure-sensitive adhesive layer being bonded to the second surface by the tissue support layer; and e. a second backing layer providing opposed first and second surfaces and having one surface thereof a second release coating releasably bonded to the second surface of the second pressure-sensitive adhesive layer; and wherein said first and second pressure-sensitive adhesive layers are water-dispersible, inherently tacky pressure-sensitive adhesives comprising from about 97% to about 45% by weight of a tacky emulsion polymer formed from about 55% to 90% by weight of a first monomer which is at least one alkyl acrylate containing from 4 to about 8 carbon atoms in the alkyl group, from about 10% to about 20% by weight of at least one unsaturated carboxylic acid, from 0% to about 15% by weight of at least one vinyl ester, and from 0% to about 15% by weight methyl acrylate, said emulsion polymer being formed in the presence of anionic and nonionic surfactants, said polymer having a glass transition temperature of about $-15°$ to about $-50°$ C., and formed in the presence of a sufficient amount of chain transfer agent to provide an emulsion polymer which, when coated onto a repulpable paper substrate, is water-dispersible and passes Tappi Useful Method 204; from 0 to about 25% by weight of an acrylic polymer having a glass transition temperature of less than $-50°$ C. and from about 3% to about 20% by weight of a plasticizer which is compatible with the emulsion and acrylic polymers and selected from the group consisting of dioctyl azelate, triethylene glycol di-2-ethylhexoate, acetyl tributyl citrate, di-butyl phthalate, di-isobutyl adipate and tri-2-ethylhexylphosphate and which adhesive is releasable from the first and second release coatings.

6. A splicing tape claimed in claim 5 in which the acrylic polymer comprises a copolymer containing 98% by weight 2-ethylhexyl acrylate, 1.5% by weight methacrylic acid and 0.5% by weight acrylic acid.

7. A splicing tape as claimed in claim 6 in which the emulsion polymer comprises a first polymer containing 60% by weight 2-ethylhexyl acrylate, about 12.5% by weight vinyl acetate, about 12.5% by weight methyl acrylate, about 11.25% by weight acrylic acid and about 3.75% by weight methacrylic acid sequentially polymerized with a monomer system comprising about 60% by weight 2-ethylhexyl acrylate, about 12.5% by weight vinyl acetate, about 15% by weight acrylic acid and about 12.5% by weight methyl acrylate.

\* \* \* \* \*